H. R. GUYOT.
DEVICE FOR COOLING THE MOTORS OF AEROPLANES OR DIRIGIBLE AIRCRAFT.
APPLICATION FILED JAN. 5, 1917.
1,386,493.
Patented Aug. 2, 1921.
6 SHEETS—SHEET 1.
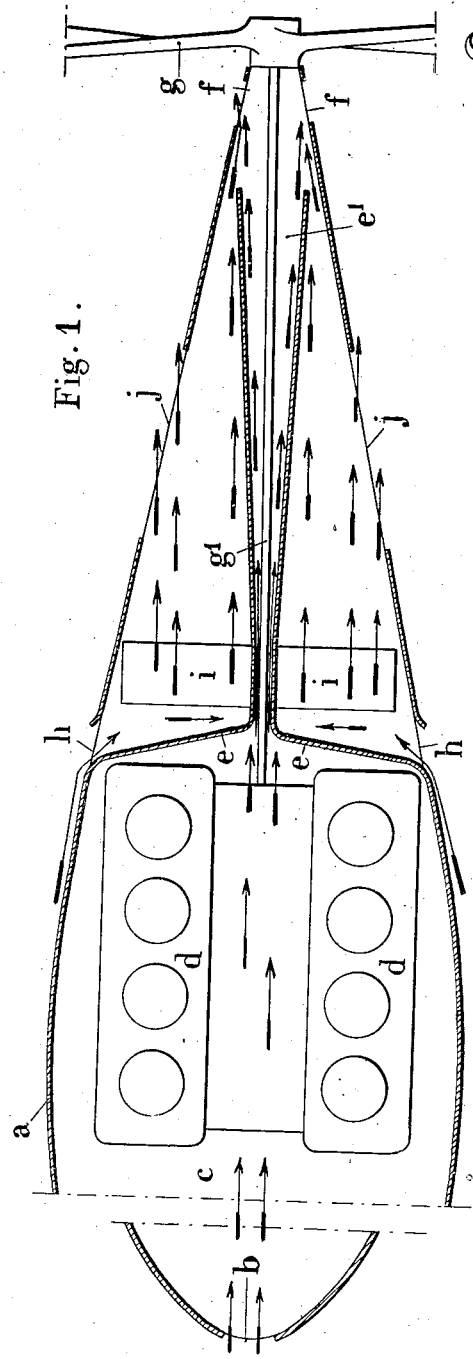
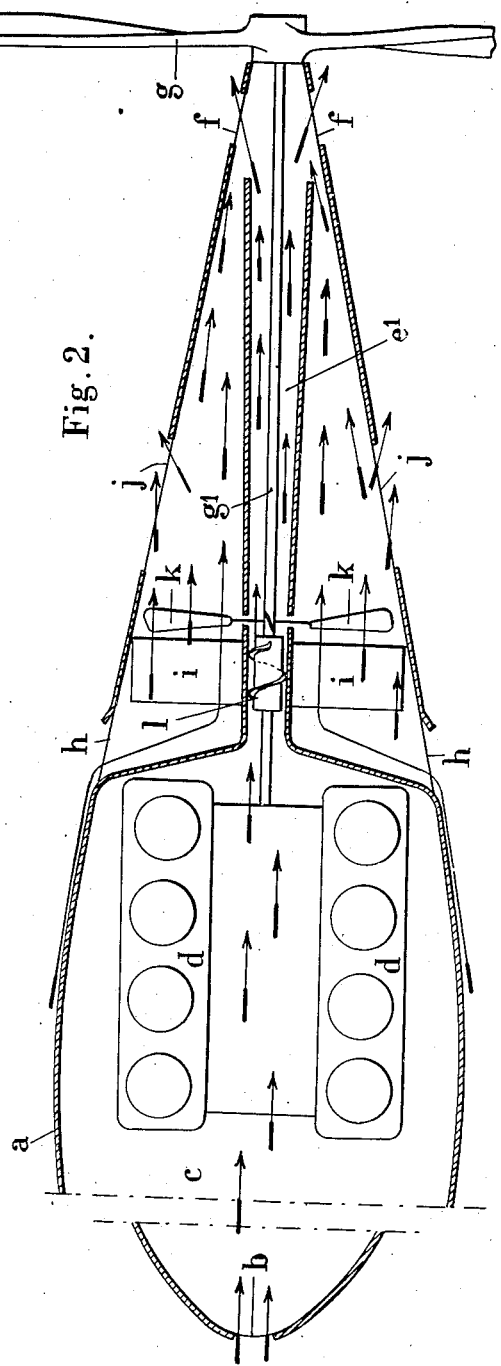
INVENTOR
HENRI RAYMOND GUYOT
BY
ATTORNEYS H. R. GUYOT.
DEVICE FOR COOLING THE MOTORS OF AEROPLANES OR DIRIGIBLE AIRCRAFT.
APPLICATION FILED JAN. 5, 1917.
1,386,493.
Patented Aug. 2, 1921.
6 SHEETS—SHEET 2.
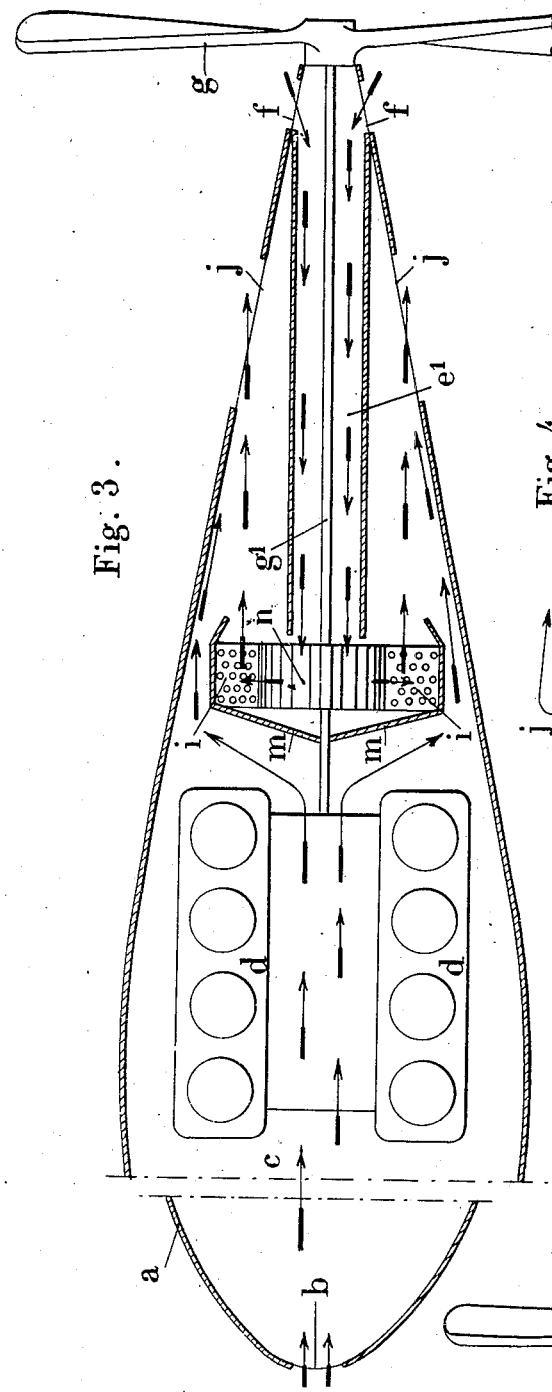
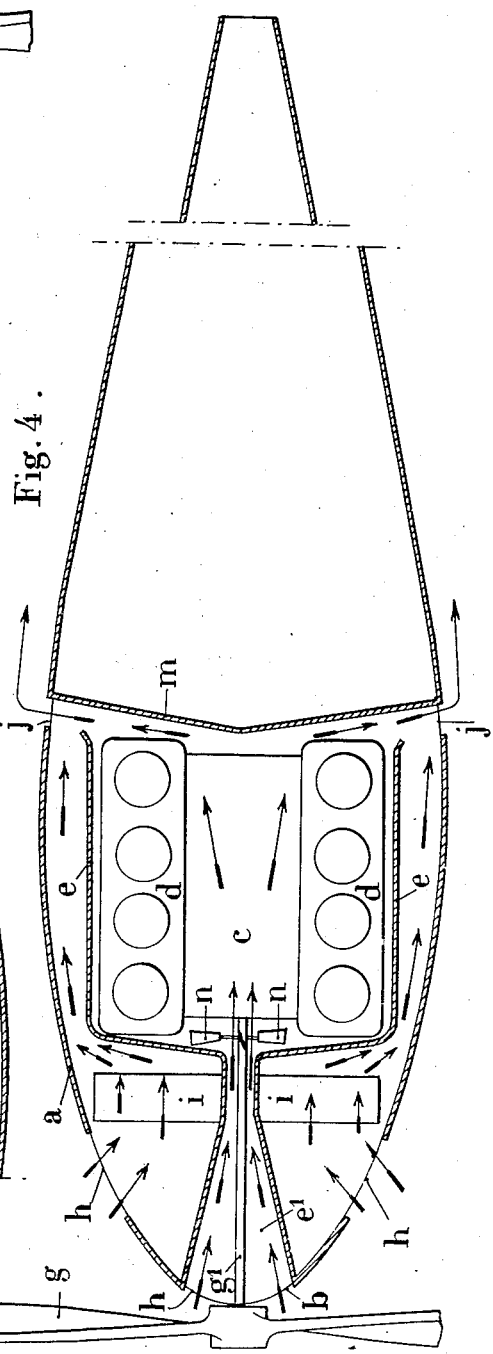
INVENTOR
HENRI RAYMOND GUYOT
BY
ATTORNEYS H. R. GUYOT.
DEVICE FOR COOLING THE MOTORS OF AEROPLANES OR DIRIGIBLE AIRCRAFT.
APPLICATION FILED JAN. 5, 1917.
1,386,493. Patented Aug. 2, 1921.
6 SHEETS—SHEET 3.
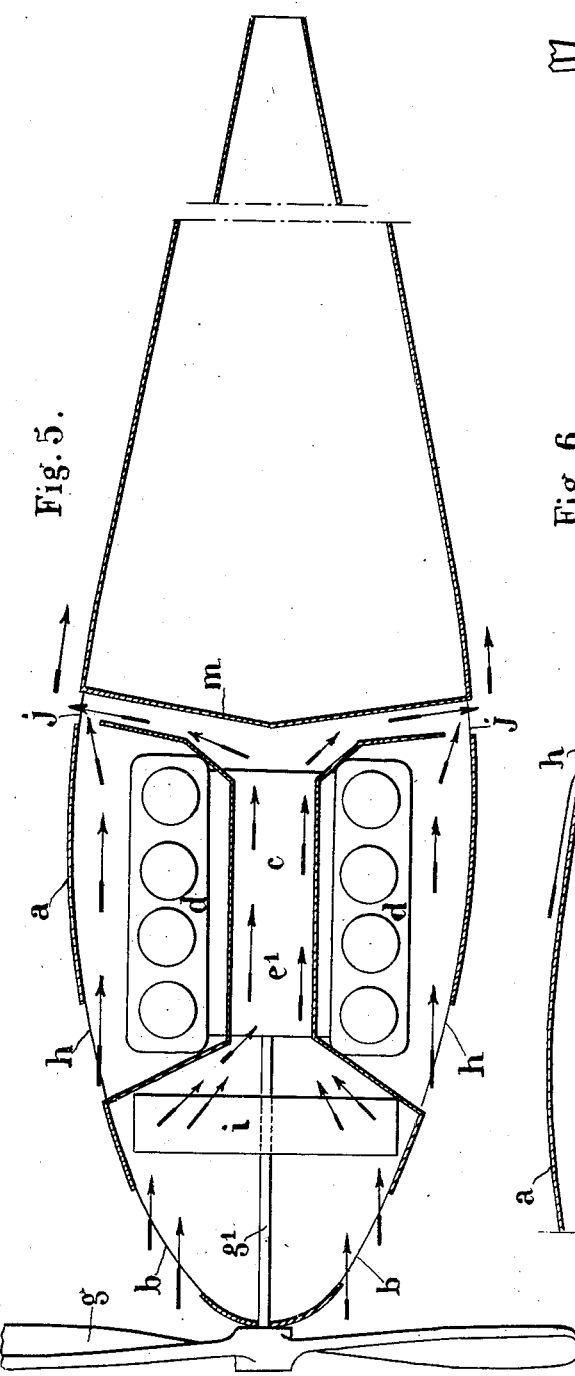
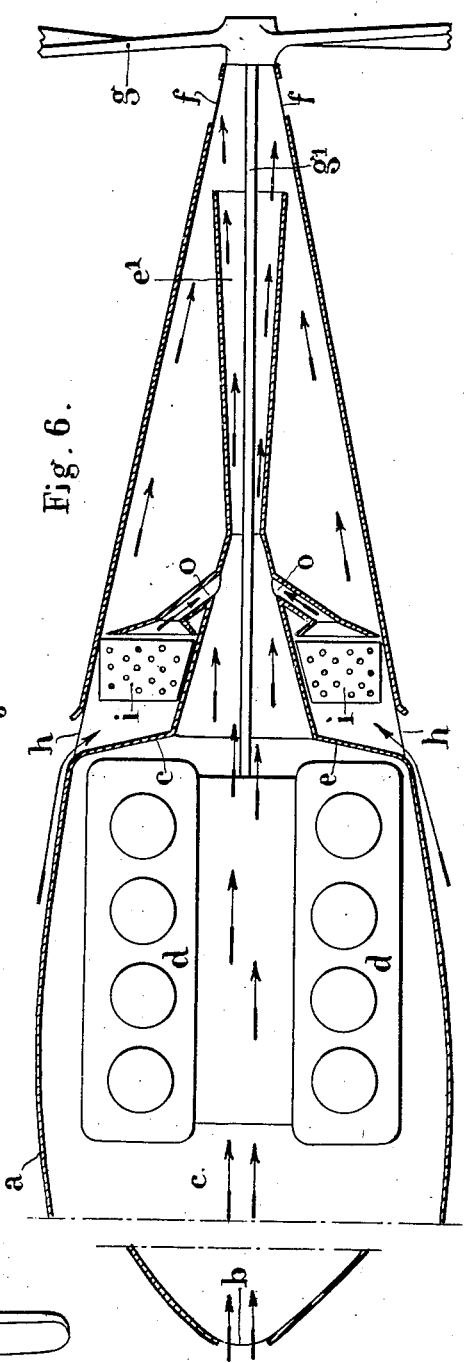
INVENTOR
HENRI RAYMOND GUYOT
BY
ATTORNEYS H. R. GUYOT.
DEVICE FOR COOLING THE MOTORS OF AEROPLANES OR DIRIGIBLE AIRCRAFT.
APPLICATION FILED JAN. 5, 1917.
1,386,493.
Patented Aug. 2, 1921.
6 SHEETS—SHEET 4.
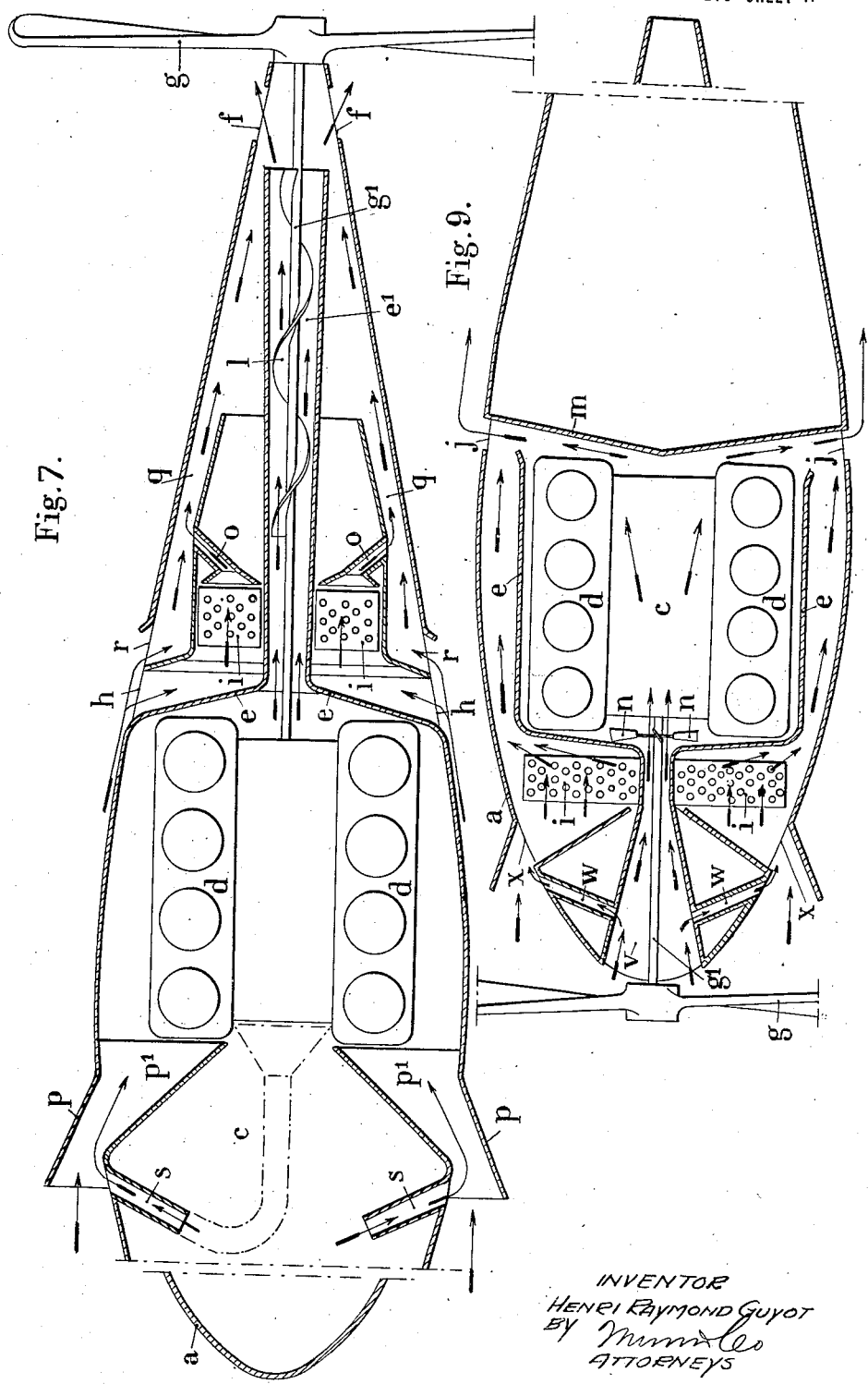
INVENTOR
HENRI RAYMOND GUYOT
BY
ATTORNEYS H. R. GUYOT.
DEVICE FOR COOLING THE MOTORS OF AEROPLANES OR DIRIGIBLE AIRCRAFT.
APPLICATION FILED JAN. 5, 1917.
1,386,493.
Patented Aug. 2, 1921.
6 SHEETS—SHEET 5.
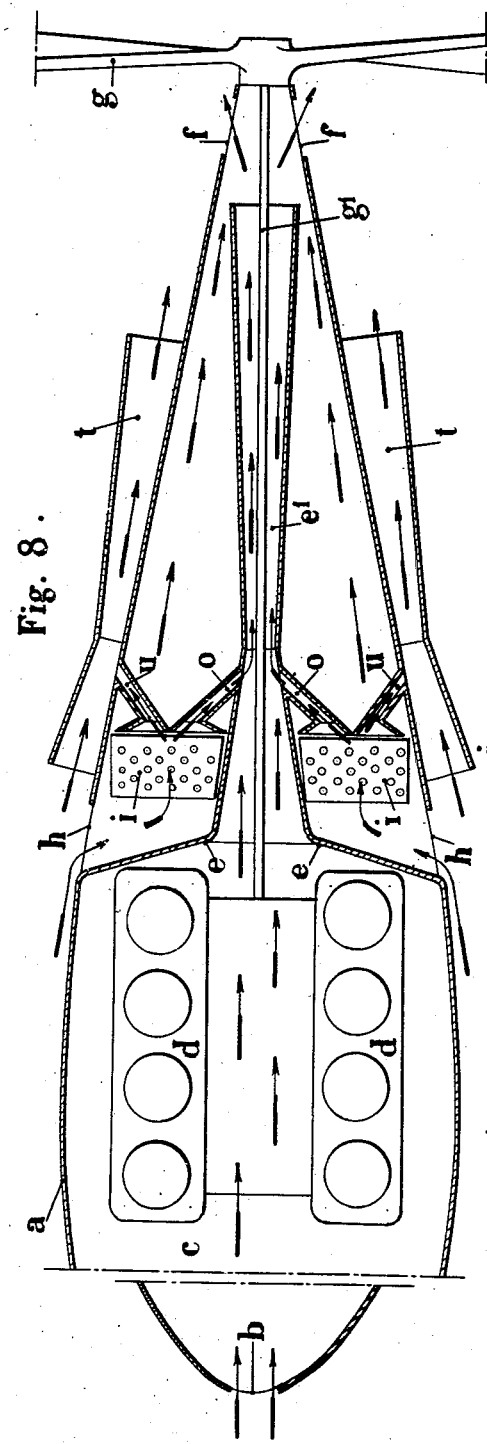
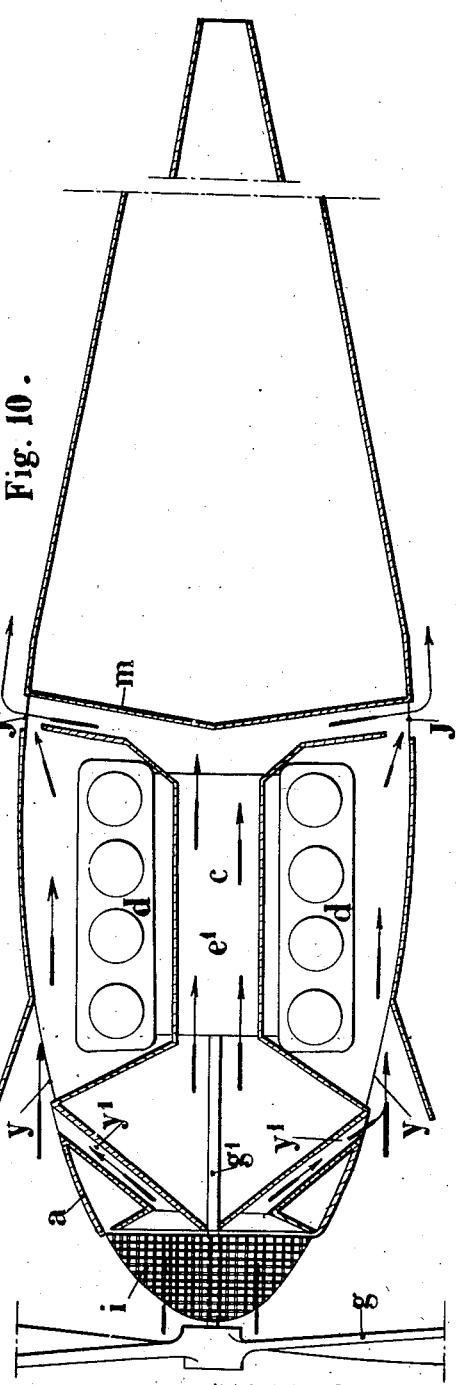
INVENTOR
HENRI RAYMOND GUYOT
BY
ATTORNEYS

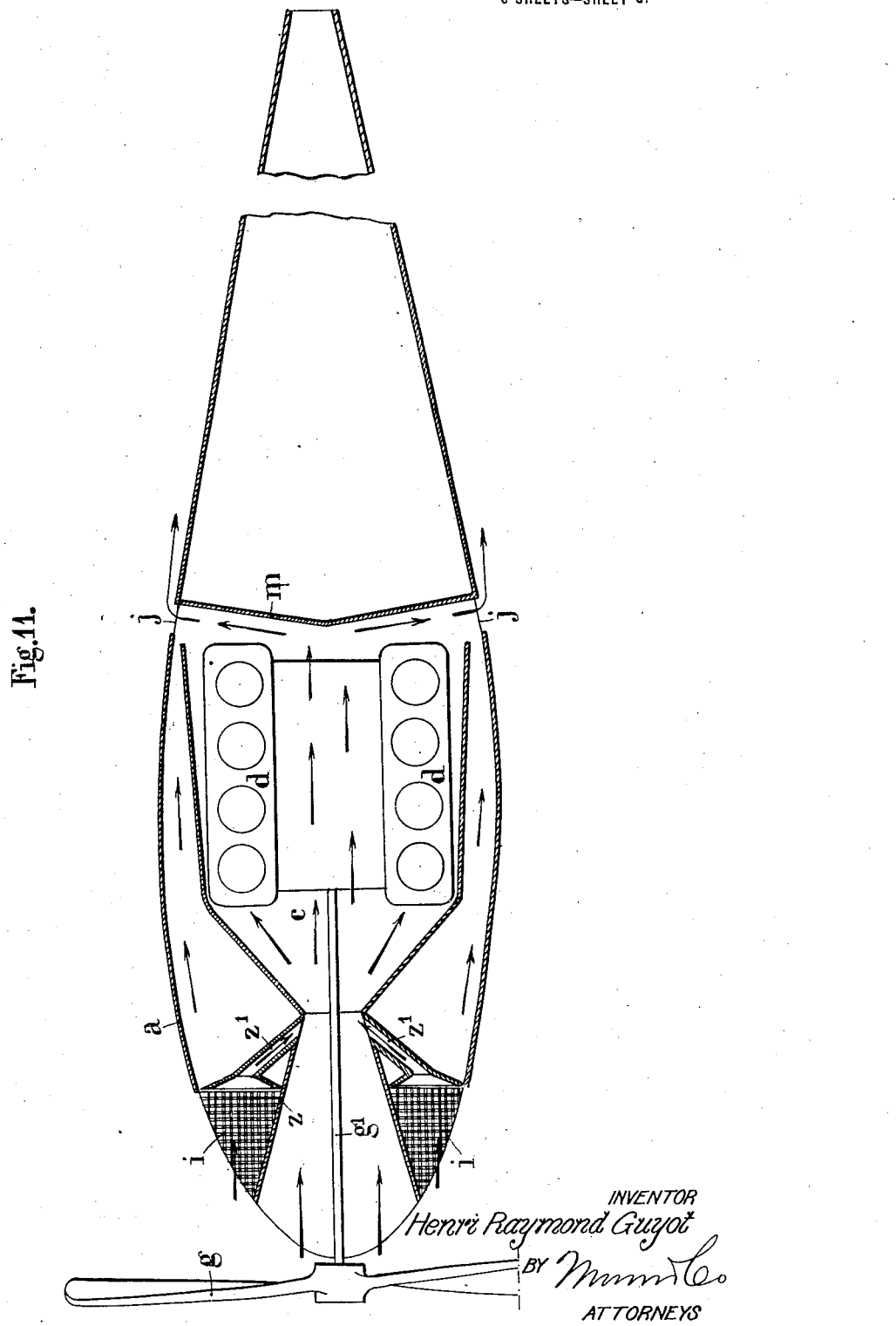

UNITED STATES PATENT OFFICE.

HENRI RAYMOND GUYOT, OF PARIS, FRANCE, ASSIGNOR TO SOCIÉTÉ R. GUYOT & CIE., OF PARIS, FRANCE.

DEVICE FOR COOLING THE MOTORS OF AEROPLANES OR DIRIGIBLE AIRCRAFT.

1,386,493.  Specification of Letters Patent.  Patented Aug. 2, 1921.

Application filed January 5, 1917. Serial No. 140,724.

*To all whom it may concern:*

Be it known that I, HENRI RAYMOND GUYOT, a citizen of the French Republic, of 54 Avenue Jean Jaurès, Paris, in the Republic of France, engineer, have invented an Improved Device for Cooling the Motors of Aeroplanes or Dirigible Aircraft, of which the following is a full, clear, and exact description.

In existing apparatus for aerial navigation the heat is such at the end of a very short time that the operation of the motor is no longer regular by reason of the unfavorable thermal conditions under which it operates.

The cooling device, which forms the subject of this invention, obviates the disadvantage above mentioned by permitting the utilization of the direct action of the speed of the aeroplane, for example, in order to cause the hot air inclosed in the chamber of the motor to circulate, this being effected by forcing in the cold air. The hot air is utilized at the same time to bring about, by a reduction of pressure, a circulation of cold air into the interior of the shell or casing for the object of passing the cold air rapidly through the tubes or members of a radiator suitably connected to the water-jacket or casing of the motor, the flow of the cold air and of the hot air taking place through passages partly formed by the casing or shell of the apparatus itself.

This arrangement effects in a simple and certain manner the internal ventilation of the shell or casing of the apparatus used for aerial navigation:—aeroplanes, dirigible balloons, etc., and also effects the perfect cooling of the motors of such apparatus; moreover, this arrangement renders the cooling members less liable to injury by reason of the position of the radiator internally to the shell or casing and at the same time only offering the minimum resistance to movement through the air.

This invention will be hereinafter described by way of example by reference to the accompanying drawings, in which:—

Figure 1 shows diagrammatically in horizontal section a first constructional form of the apparatus forming the subject of the application, as applied to an aeroplane.

Fig. 2 shows a second constructional form of this apparatus.

Fig. 3 shows a third constructional form of the apparatus.

Fig. 4 shows a fourth constructional form of the apparatus.

Fig. 5 shows a fifth constructional form of the apparatus.

Fig 6 shows a sixth constructional form of the apparatus with the propeller placed at the rear.

Figs. 7 and 8 are two other modifications of this apparatus with the propeller placed at the rear.

Figs. 9 to 11 show three modifications of this arrangement with the propeller placed at the front.

As shown in this drawing, Fig. 1, this arrangement in its first form comprises at the front of the aeroplane $a$, for example, an aperture $b$ formed in the chamber $c$ inclosing the motor $d$.

At the rear of the motor there are two partitions $e$ which are extended rearwardly and at the same time are arranged to diverge. These partitions terminate opposite apertures $f$ formed in the shell or casing on the two sides of the propeller $g$. The partitions $e$ form a passage $e'$.

In the shell of the apparatus directly in the rear of the partitions $e$ there are apertures $h$ behind which there is the radiator $i$ and finally other apertures $j$.

Under the action of the speed of the aeroplane the cold air passing through the aperture $b$ enters the chamber $c$ containing the motor and moves toward the rear of the apparatus drawing with it hot air from the chamber $c$, and the whole flows along the passage $e'$ in order to pass out through the apertures $f$. Moreover, by reason of the movement of the aeroplane and of the current of hot air the cold air drawn in through the apertures $h$ formed in the sides of the apparatus passes through the radiator $i$ and leaves the apparatus in a heated condition through the apertures $j$ and $f$.

Finally the screw propeller $g$, arranged at the rear of the apparatus in order to propel it, effects the drawing in of air by the action of the vacuum which it produces around it.

In the constructional form shown in Fig. 2, a fan $k$ is arranged behind the radiator, moreover a screw $l$ of very quick pitch is arranged in the central passage $e'$. The fan $k$ and the screw $l$ fixed on the shaft $g'$ of the propeller effect the drawing in of air.

In the constructional form shown in Fig. 3, the hot air coming from the motor chamber meets a conical deflector $m$, passes to the periphery of the latter, moves along the internal wall of the shell and goes out through the lateral apertures $j$.

Moreover a centrifugal fan $n$, fixed on the shaft $g'$ of the propeller, draws forward the air which comes in from the rear through the apertures $f$ and the central passage $e'$ in order to deliver it into a radiator $i$, whence it then escapes moving from front to rear through the apertures $j$ formed in the sides of the shell of the aeroplane.

In the form of construction shown in Fig. 4, the propeller $g$ is arranged in front of the aeroplane and consequently works as a tractor.

The cold air, thrown back by the propeller and by the movement of the apparatus into the central passage $e'$, is also drawn by a fan $n$ fixed on the shaft $g'$ of the propeller. This air then passes through the motor chamber $c$, absorbs the heat and meets a conical baffle $m$ which deflects it whereupon it escapes laterally through the apertures $j$ formed in the shell of the apparatus.

Moreover the movement of the apparatus causes the cold air to enter through the apertures $h$; this air, passing through a radiator $i$ in which it is heated, passes along a wall or partition $e$ and goes out through the lateral apertures $j$ formed in the shell of the apparatus. Moreover the cold air is forced into the apertures $h$ by the action of the propeller.

In the form of construction shown in Fig. 5, the propeller $g$ is arranged in front of the aeroplane and consequently works as a tractor.

The cold air thrown back by the propeller and by the movement of the apparatus after having entered through the apertures $b$ passes through a radiator $i$ and moves in the central passage $e'$ whereupon it meets a conical baffle $m$ which deflects it and causes it to pass out hot through the lateral apertures $j$ formed in the shell of the apparatus.

Moreover the movement of the apparatus drives the cold air, which has entered through the apertures $h$, on to the sides of the motor; this heated air then passes out through the lateral apertures $j$ at the same time causing the exit of the hot air passing through the central passage $e'$ of the apparatus.

The radiator may be arranged in any desired position in the apparatus; it can also be placed either at the front or at the rear of the shell itself.

Also for the purpose of increasing the diminution of pressure any apparatus for drawing or propelling fluids can be used.

In the form of construction shown in Fig. 6 the escape of hot air from the motor chamber $c$ always takes place, as in the examples above mentioned, through the outlet passage $e'$, but in this modification the passage $e'$ has the form of a double cone forming an outlet device.

On the first of these cones, that is to say on the larger of the latter there are air conduits $o$ connected to the radiator $i$.

The intense circulation of air in the external passage formed by the shell $a$ is thus increased to a large degree since, independently of the action of the hot air on the cold air and of the diminution of pressure produced by the propeller $g$, there is added a diminution of pressure produced by the air injector $e'$ above mentioned.

In the form of construction shown in Fig. 7 the air injector is formed by external passages $p$ and by the shell of the apparatus.

By reason of the diminution of pressure the air enters into the tubulous radiator $i$; it also enters through the passage $q$ in the form of a double cone comprising air conduits $r$ which afford the diminution of pressure.

In this form of construction the apparatus is not open at the front, and the ventilation of the motor chamber takes place through the two injectors $p$ which deliver directly on to the cylinders of the motor through conduits $p'$ also withdrawing air from the shell $a$ by reason of the tubes $s$ which can be extended as indicated in the drawings.

A helix or quick-threaded screw $l$ further increases the action of the hot air on the cold air.

In the form of construction shown in Fig. 8 the two air injectors $t$ are at the exterior of the shell $a$ which itself forms a part of these injectors; moreover two drawing-in tubes $u$ are connected to the radiator $i$ and likewise increase to a high degree the diminution of pressure throughout the radiator.

The above modifications comprise a propeller screw $g$ arranged at the rear and propelling the apparatus; moreover these modifications comprise internal radiators $i$ arranged behind the motor chamber and separated from the latter by a suitable baffle $e$.

In the constructional form shown in Fig. 9 the air enters at the front of the apparatus through a cone $v$ while two injectors $w$, arranged on each side of the apparatus, serve to deliver the air on to the air inlets $x$ and thence into the radiator in such a manner that the latter receives the maximum amount of cold air. The discharge of hot air always takes place by the action of the hot air on the cold air and of the diminution of pressure produced by the propeller.

In the form of construction shown in Fig. 10 the radiator $i$ is at the front of the apparatus itself, and the entrance of cold air into the motor chamber takes place by the action of two injectors $y$ having inlets $y'$ in communication with the radiator.

In the form of construction shown in Fig. 11 the cold air is taken in at the front of the apparatus and passes, under the action of an injector $z$, into the second part forming the motor chamber; moreover two air inlets $z'$ are arranged on the radiator $i$ the parts of which are mounted on each side of the drawing-in cone $z$. These three modifications comprise a helix $g$ acting as a tractor and radiator-members, the latter being arranged in front of the shell of the apparatus.

What I claim is:—

1. A cooling apparatus for the motors of aeroplanes or dirigible aircraft permitting the utilization of the direct action of the speed of the aeroplane, for example, in order to set in motion by the aid of a current of cold air the hot air inclosed in the motor chamber, this hot air being utilized at the same time to cause by diminution of pressure a circulation of cold air in the interior of the shell, this apparatus consisting of a radiator and an air inlet formed at the front of the aeroplane and putting the exterior into communication with the motor chamber; two partitions arranged at the rear of the motor, which are extended rearwardly and diverge and which terminate opposite outlet apertures formed in the shell on the two sides of the propeller, these partitions forming a kind of central passage directed toward the rear; lateral air inlets arranged in the shell of the aeroplane in front of the radiator, and other lateral outlet apertures formed at the rear of the radiator; as described and shown.

2. A constructional form of the apparatus described, comprising a radiator and an air inlet formed in front of the aeroplane; two partitions forming a central passage arranged in the rear of the motor, which are extended laterally and are divergent and terminate opposite outlet apertures formed in the shell on two sides of the propeller; a quick-pitched screw which is of considerable length and is arranged in the central passage and fixed on the propeller shaft; a fan fixed on the propeller shaft; lateral air inlets formed in the shell of the aeroplane in front of the radiator and other lateral outlet apertures formed behind the radiator; as described and shown.

3. A constructional form of the apparatus described, including a casing having a motor chamber, a forward air inlet into the motor chamber and rear air outlets, means forming an air passage extending rearwardly from the motor chamber to the air outlets, a propeller at the rear having its shaft extending through the passage, and a radiator at the rear of the motor chamber and in communication with the air outlets, said casing having air inlets communicating with the radiator.

4. A constructional form of the apparatus described, including a casing having a motor chamber, a forward air inlet into the motor chamber and rear air outlets, means forming an air passage extending rearwardly from the motor chamber to the air outlets, a propeller at the rear having its shaft extending through the passage, a radiator at the rear of the motor chamber and in communication with the air outlets, said casing having air inlets communicating with the radiator, and a screw on the propeller shaft in said air passage.

5. A constructional form of the apparatus described, including a casing having air inlets and outlets and separate motor and radiator chambers through which air is circulated, a motor in the motor chamber, a radiator in the radiator chamber, means forming a longitudinal air passage communicating with certain of the air inlets of the casing and terminating adjacent to the outlets, a propeller, and a propeller shaft extending through the said longitudinal passage.

6. A constructional form of the apparatus described, including separate motor and radiator chambers provided with air inlets and outlets, of which the said outlets are adjacent to one another, a motor in the motor chamber, a radiator in the radiator chamber, means forming a longitudinal air passage communicating with the inlet and outlet of the motor chamber, a propeller, and a shaft for the propeller extending through said passage.

7. A cooling apparatus for the motors of aeroplanes and the like, comprising a casing having air outlets and a motor chamber, a motor in said chamber, a raditor within the casing, said casing having separate air inlets to the motor chamber and radiator, and means whereby the air passing through the radiator is made to assist the circulation of air through the motor chamber.

8. A cooling apparatus for the motor of aeroplanes and the like, comprising a casing having a motor chamber, and provided with inlet and outlet openings to cause air to circulate in the motor chamber by the movement of the machine, a motor in said chamber, and a radiator carried by the causing and having communication with the outer air separate from that through which air is admitted to the motor chamber to permit cold air to be heated and made to assist in circulating the air in the motor chamber.

9. A cooling apparatus for the motor of an aeroplane and the like, comprising a casing having a motor chamber and provided with inlet and outlet openings to cause air to circulate in the motor chamber by the movement of the machine, said casing being provided with longitudinal passages leading to the outlet of the casing, a motor in the said chamber, and a radiator carried by the casing outside of the motor chamber, said radiator communicating with the outer air and from which the heated air is discharged into the said passages.

10. A cooling apparatus for the motor of aeroplanes and the like, comprising a casing having a motor chamber and provided with inlet and outlet openings to cause air to circulate in the motor chamber by the movement of the machine, said casing being provided with longitudinal passages leading to the outlet of the casing, a motor in the casing, a propeller carried by the casing and serving in addition to propelling the machine to cause the air to pass through the casing, and a radiator carried by the casing outside of the motor chamber, the radiator communicating with the outer air and from which the heated air is discharged into the said passages.

11. In an aeroplane, a casing, an engine therein, a propeller, a radiator in the casing between the engine and propeller, and means forming separate air passages for the engine and radiator, the casing having inlet and outlet openings communicating with said passages.

12. In an aeroplane, a casing having a motor chamber, a propeller, a radiator within the casing and outside of the motor chamber, said radiator being arranged between the motor chamber and the propeller, and said casing having separate air passages for the motor chamber and radiator.

The foregoing specification of my improved device for cooling the motors of aeroplanes or dirigible aircraft, signed by me this eighteenth day of December 1916.

HENRI RAYMOND GUYOT.

Witnesses:
FRANÇOIS WEBER,
CHAS. P. PRESSLY.